J. A. EATON.
TRUCK CONVEYER AND UNLOADER.
APPLICATION FILED DEC. 8, 1919.
1,388,245.
Patented Aug. 23, 1921.
3 SHEETS—SHEET 2.
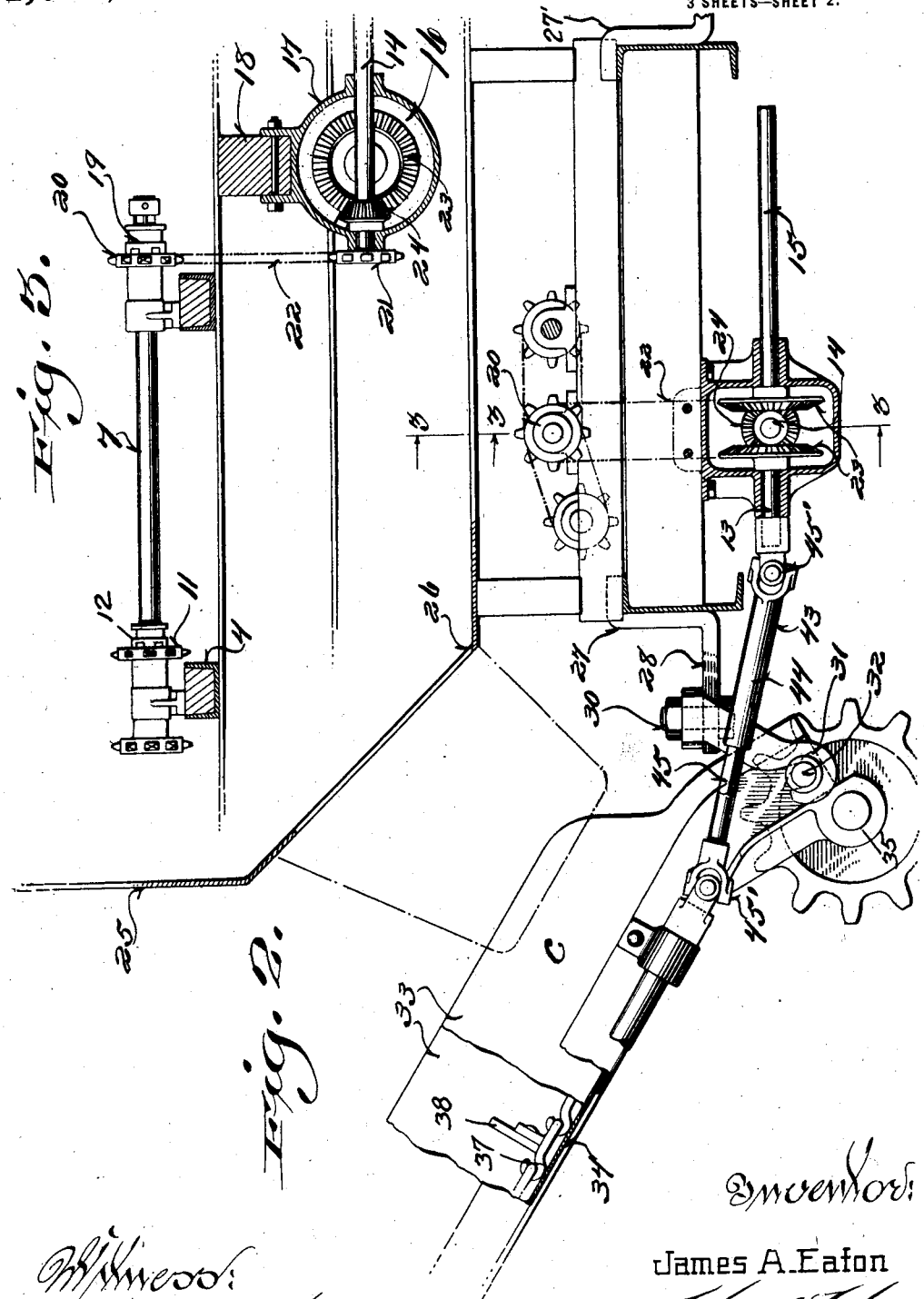
Inventor:
James A. Eaton

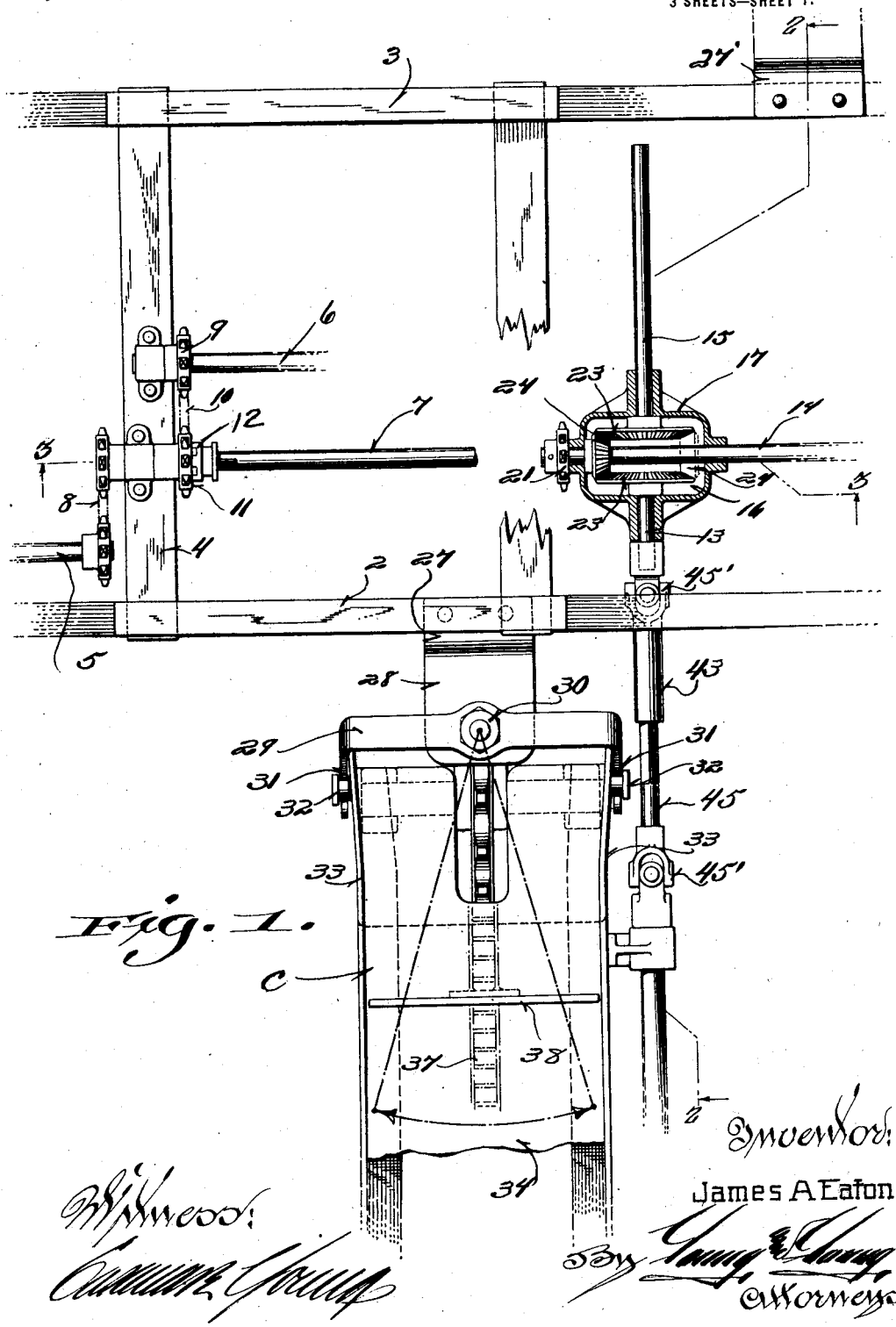

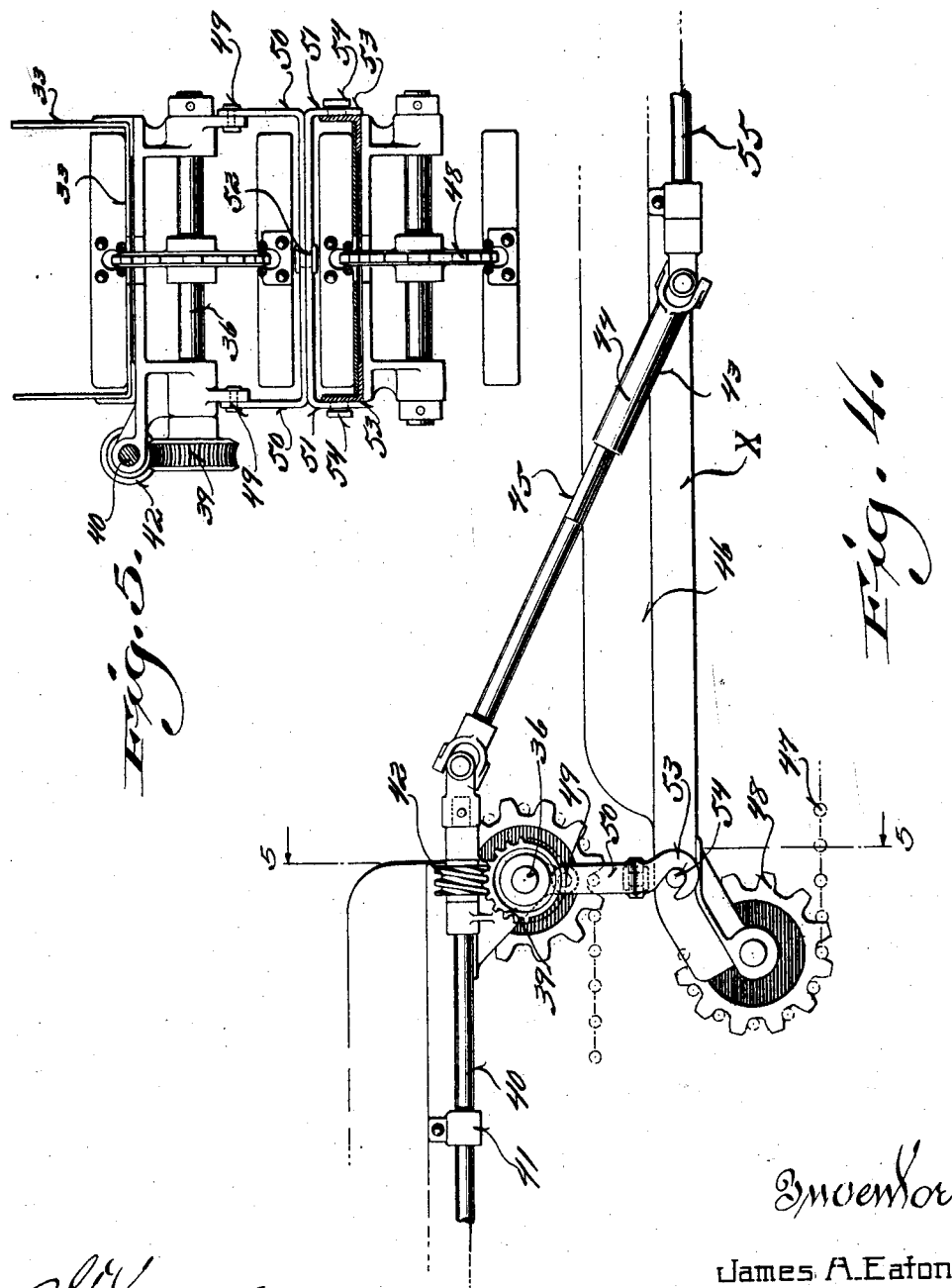

UNITED STATES PATENT OFFICE.

JAMES A. EATON, OF MILWAUKEE, WISCONSIN.

TRUCK CONVEYER AND UNLOADER.

1,388,245.   Specification of Letters Patent.   Patented Aug. 23, 1921.

Application filed December 8, 1919. Serial No. 343,246.

*To all whom it may concern:*

Be it known that I, JAMES A. EATON, a citizen of the United States, and resident of Milwaukee, in the county of Milwaukee and State of Wisconsin, have invented certain new and useful Improvements in Truck Conveyers and Unloaders; and I do hereby declare that the following is a full, clear, and exact description thereof.

My invention relates to new and useful improvements in unloading mechanism for use on vehicles, particularly motor vehicles, whereby the power thereof may be utilized for operating the unloading mechanism.

Most large trucks, for instance those adapted for transporting coal, crushed stone and the like, are provided with an unloading means, but in most instances this means is gravity actuated so that it is necessary to either have the truck body elevated or else have the point of discharge of the conveyer below the level of the bottom of the truck body. Furthermore such trucks and unloading means are usually arranged so that the latter may discharge from the truck body only at one point, thus limiting the scope of action of the truck. And, in those trucks equipped with mechanical unloaders the same fault is usually present, namely their action is limited by a single point of discharge.

One of the primary objects of the present invention, therefore, is to provide a truck body having a plurality of points of discharge with a mechanical unloading mechanism which can be selectively located in position to receive material from either of said points of discharge. As subsidiary to this main object, it is also the purpose of the invention to have an improved coupling arrangement for quickly and easily assembling the conveyer with the truck at either one of said several points of discharge.

It is a further object to provide an arrangement for use in connection with motor trucks whereby the power from the power plant thereof may be transferred to a mechanical conveyer when the same is located in either one of a plurality of positions.

Still another object of the invention is to provide a simply constructed conveyer extension which may be coupled with the ordinarily used conveyer.

With these general objects in view, the invention consists in the novel features of construction, combination and arrangement of parts which will be hereinafter more particularly described and claimed.

In the accompanying drawings:

Figure 1 represents a plan view, partly in section, of a portion of a motor truck chassis showing the manner of connecting a mechanical conveyer of improved design therewith.

Fig. 2 is a vertical, substantially transverse, section taken approximately on the plane of the line 2—2 of Fig. 1.

Fig. 3 is a vertical longitudinal section taken substantially on the plane of the line 3—3 of Fig. 1.

Fig. 4 is an elevational view of the outer end of a main conveyer and the inner end of the conveyer extension showing the manner of connecting the same, and Fig. 5 is a sectional view taken on the plane of the line 5—5 of Fig. 4.

Referring more particularly to the drawings, wherein similar reference characters indicate like parts throughout the different views, it will be noted that the numeral 1 denotes generally a motor truck frame having side bars 2 and 3 and transverse connecting bars 4. The drawings depict a portion of the chassis of a well known type of truck which, in addition to the frame 1 includes a longitudinally extending counter shaft 5 from which power is transmitted from the engine (not shown), to a hoist shaft 6. In adapting this type of truck for use with my invention, I position a main conveyer drive shaft 7 longitudinally of the frame 1, parallel to the shafts 5 and 6 and between the same as shown in Figs. 1 and 2, this shaft 7 being journaled in bearings carried by the transverse bars 4.

The counter-shaft 5 is connected with the shaft 7 by means of sprockets and sprocket chain 8, the hoist shaft 6 being likewise provided with a sprocket 9 which connects through a sprocket chain with the clutch carried sprocket 11, the clutch 12 thereof being located on the drive shaft 7. Thus the hoist shaft can be intermittently driven through the drive shaft 7 which is continuously driven by the counter-shaft 5. In other styles of trucks this same arrangement may be carried out in a slightly different manner.

From the main conveyor drive shaft 7 power is transferred to any one of several, in the present instance three, auxiliary conveyer drive shafts 13, 14 and 15 through a transmission mechanism 16, which is inclosed in a casing 17 and hung from a transverse frame bar 18. Rotation of all of these auxiliary shafts is within the control of the truck operator by a clutch 19 on the shaft 7, which clutch carries a sprocket 20 for co-operation with a second sprocket 21 through a sprocket chain 22.

It will be noted from Fig. 1 particularly that the transmission mechanism 16 includes a pair of bevel gears 23 and a bevel pinion 24. By changing the position of the bevel pinion 24 on the shaft 14 with respect to opposite ends of the housing 17, it will be appreciated that the direction of rotation of the auxiliary shafts 13, 14 and 15 may be changed, and by this arrangement a proper rotation of these shafts is easily secured regardless of the direction of rotation of the counter-shaft 5. In other words provision is designed to be made for securing the bevel pinion to the shaft 14 as shown in Fig. 1 in full lines, or as indicated in dotted lines.

Upon the chassis frame is mounted a truck body 25 having a plurality of discharge openings in its bottom or side or end walls, one of which is indicated at 26 in Fig. 2. A substantially rightangular bracket 27 is secured to the frame bar 2 and has a laterally projecting attaching arm 28 provided with a pivot bolt opening. This bracket is preferably located directly beneath the opening 26, and disposed beneath a similar opening in the truck body on the opposite side thereof is a second bracket 27', this bracket being also secured to the frame, to the bar 3 thereof. Similarly a third bracket may be attached to the frame 1 at the rear end thereof below a rear opening in the body 25, if such is used.

These several brackets are adapted to form attaching means for a mechanical conveyer designated broadly by the character C. When not in use this conveyer is preferably disposed longitudinally of the truck and hung upon the side thereof in any convenient manner. When, however, it is to be used for the purpose of unloading the truck body 25 and transporting the materials therein to some other receptacle, a yoke 29 at its inner end is hung over the arm 28 of the selected bracket and a bolt opening therein alined with the one in said arm. A pivot bolt 30 secures the bracket and the yoke together so that the latter may be swung in a horizontal plane.

Each of the arms of the yoke 29 is hook-shaped as at 31, and the eyes of the hooks form bearings for laterally extending pintles 32. These pintles extend from opposite side walls 33 of the chute of the conveyer, the bottom 34 of which is solid. In view of the pivot bolt 30 and the connections between the yoke 29 and conveyer chute, it will be seen that the outer end of the conveyer C will have orbital movement in both vertical and horizontal directions; the range of action of this conveyer is therefore relatively great.

In mechanical construction, the conveyer C, in addition to the chute composed of the sides 33 and bottom 34, consists of sprocket shafts 35 and 36, the same being located respectively at the inner and outer ends thereof, an endless conveyer belt 37 having transverse lags 38, and means for rotating the sprocket shaft 36, it being necessary to provide the moving means for the endless conveyer belt at the outer end of the conveyer to procure the most efficient operation.

This means comprises a spiral gear 39 on the shaft 36, a spiral gear shaft 40 extending longitudinally of the conveyer chute and mounted in bearings 41 carried thereby, and a spiral 42 which is fixed to the shaft 40, and is in mesh with the spiral gear 39. The lower end of the spiral gear shaft is adapted to be connected with either of the auxiliary shafts 13, 14 or 15 by a universal extensible and contractile coupling 43. The drawings illustrate this coupling as comprising a sleeve portion 44 which telescopingly receives a shaft section 45, the outer ends of each of which parts carry universal joints 45', but a flexible shaft or the like may be used to secure the same results.

By connecting the universal joint 45' of the sleeve portion 44 of the coupling 43 with either of the auxiliary shafts 13, 14 and 15, when the conveyer C is supported on the bracket which is adjacent to the selected opening in the truck body and the contiguous auxiliary shaft, movement of the endless conveyer belt and the lags thereof may be procured. It will be noted that inasmuch as the auxiliary shafts 13 and 15 rotate in opposite directions, and that the bracket 27 is located forwardly of the shaft 13 and the bracket 27' rearwardly of the shaft 15, proper direction of rotation is imparted to the spiral gear shaft 40 when the conveyer is disposed in either of its selected positions. Obviously the bevel pinion 24 takes care of the proper direction of rotation of the rearwardly extending auxiliary shaft 14.

The conveyer C may be made any convenient length and have its outer end supported in any desired manner, but at times it may be necessary to add a conveyer extension such as is shown at X in Fig. 4. This extension comprises a conveyer chute having sides 46, an endless conveyer belt 47 which is trained about a sprocket 48 mounted in a manner similar to the sprocket of the shaft 35, as well as means for connecting the chute to the end of the conveyer C and means for moving the endless conveyer belt 47.

As a means for quickly detachably connecting the conveyer extension X to the conveyer C, the bearings which support the shaft 36 are provided with eyes 49 to which are pivoted the arms of a supporting yoke 50. A second yoke 51, similar to the yoke 29, is pivoted at 52 to the yoke 50, and its arms are hook-shaped as at 53 for the reception of pintles 54 extending laterally from the walls 46 of the conveyer extension X. By this arrangement the outer end of the extension may be moved horizontally and vertically in a manner similar to the movement of the similar end of the conveyer C.

The outer or free end of the conveyer extension X is substantially similar to the outer end of the conveyer C as respects the means for operating the endless belt 47, and because of this similarity these parts have not been particularly illustrated in the present drawings. However, Fig. 4 illustrates the manner of connecting the shaft 40 of the conveyer C with a similar spiral gear shaft 55 of the extension X, this means consisting of a coupling 56 similar in all respects to the coupling 43, and like this coupling 43, it may have a flexible shaft member substituted therefor.

From the foregoing description taken in connection with the accompanying drawings, it will be appreciated that I have invented an improved mechanical conveyer which, because of its adaptability to various types of motor vehicles and its considerable range of use, will be exceptionally useful in the unloading of coal, gravel and similar trucks. Various modifications may be made, as heretofore intimated, in the form and proportion and in the association with respect to each other of the various parts, without departing from or sacrificing any of the principles thereof.

I claim:

1. The combination with a portable receptacle, of a two-part drive shaft disposed transversely of the direction of normal movement of the receptacle, means for revolving the parts of the shaft in opposite directions, a supporting bracket carried by the receptacle forwardly of one part of the drive shaft, a second supporting bracket carried by the receptacle rearwardly of the other part of the drive shaft, a mechanical conveyer adapted to be selectively connected to either of said brackets, and means for coupling the operating means of the conveyer with either part of said shaft.

2. The combination with a portable receptacle, of a mechanical conveyer pivoted thereto to swing vertically and horizontally, drive means carried by the receptacle, means for connecting the drive means with the operating means of the conveyer, a detachable conveyer extension carried by the outer end of the conveyer, and means for detachably connecting the operating means of the conveyer with the operating means of the conveyer extension.

3. The combination with a portable receptacle, of a two-part drive shaft disposed transversely of the direction of normal movement of the receptacle, means for revolving the parts of the shaft in opposite directions, a plurality of brackets carried by the receptacle one being adjacent each part of the drive shaft, a mechanical conveyer adapted to be selectively supported by either of said brackets and means for forming a driving connection between said conveyer and that part of the shaft adjacent thereto.

4. The combination with a vehicle and a receptacle mounted thereon having an outlet in its bottom for discharging material therefrom, of a supporting bracket mounted on said vehicle beneath said discharge outlet, a yoke mounted on said bracket and angularly adjustable about a vertical axis, a mechanical conveyer and means for pivotally connecting the same to said yoke for vertical adjustment about said pivot, drive means carried by the vehicle and means for connecting said drive means with the operating means of the conveyer, said connecting means being adjustable to compensate for the adjustment of the position of the conveyer.

In testimony that I claim the foregoing I have hereunto set my hand at Milwaukee, in the county of Milwaukee and State of Wisconsin.

JAMES A. EATON.